3,103,512
PRODUCTION OF 2,4-BIS-AMINO-6-TRICHLORO-
METHYL-S-TRIAZINES
Otto Weiberg, Frankfurt am Main, Germany, assignor to Deutsche Gold- und Silber-Scheideanstalt vormals Roessler, Frankfurt am Main, Germany
No Drawing. Filed July 28, 1961, Ser. No. 127,490
Claims priority, application Germany Aug. 10, 1960
3 Claims. (Cl. 260—249.9)

The present invention relates to an improved process for the production of 2,4-bis-amino-6-trichloromethyl-s-triazines of the formula

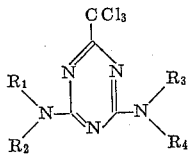

in which $R_1$–$R_4$ can be hydrogen and/or alkyl, preferably lower alkyl.

Syntheses of this type of compounds, as is known (A. Weddige, J. Pr. Chem., 33, 77 (1886)), can be effected by heating 2,4,6-tris-trichloromethyl-s-triazine with amines in alcoholic solution at 110° C. under pressure for several hours. Unsymmetrically substituted compounds may also be produced by reacting 2-alkylamino-4,6-bis-trichloromethyl-s-triazines with another amine. This process, however, has the disadvantage that it is necessary to work at elevated temperatures under pressure and that the reaction requires several hours.

According to the invention it was found that 2,4,6-tris-trichloromethyl-s-triazines or 2-amino-4,6-bis-trichloromethyl-s-triazines can be reacted with ammonia or primary or secondary amines in short periods of time with good yields if the reaction is carried out in the presence of an alkali metal alcoholate, preferably in quantities of 0.1 to 10% by weight. Advantageously room or only slightly raised temperatures without application of pressure are employed. In order to facilitate the reaction it is advisable to use a lower aliphatic alcohol as a solvent for the reaction.

The compounds produced are useful as fungicides.

The following examples will serve to illustrate several embodiments of the invention. In such examples the proportions are given in parts by weight unless otherwise specified.

Example 1

21.7 parts of 2,4,6-tris-trichloromethyl-s-triazine were suspended in a solution of 3.1 parts of methyl amine in 70 parts of methanol. 0.65 part of sodium in the form of a sodium methylate solution were added to the suspension at room temperature. The starting material went into solution while undergoing the exothermic reaction and the reaction product crystallized out. After ½ hour the product was filtered off on a suction filter and dried. 12.7 parts (99.3% of the theoretical) of 2,4-bis-methylamino-6-trichloromethyl-s-triazine were obtained. M.P. 205–208° C.

Example 2

21.7 parts of 2,4,6-tris-trichloromethyl-s-triazine were reacted with 4.9 parts of ethylamine in 60 parts of methanol in the presence of 1% of sodium methylate as in Example 1. 13.1 parts (93% of the theoretical) of 2,4-bis-ethylamine-6-trichloromethyl-s-triazine of a M.P. of 126–127° C. were obtained.

Example 3

77.4 parts of 2-diethylamino-4,6-di-trichloromethyl-s-triazine were reacted with 2.6 parts of methylamine in 60 parts of methanol in the presence of 2.3 parts of sodium as sodium methylate as in Example 1. The solvent was distilled off and the residue recrystallized from benzine. 52 parts (87% of the theoretical) of 2-diethylamino-4-methylamino-6-trichloromethyl-s-triazine of a melting point 75–77° C. were obtained.

Example 4

18.7 parts of 2-isopropylamino-4,6-bis-trichloromethyl-s-triazine were reacted with 2.47 parts of ethylamine and 0.56 parts of sodium in 30 parts of methanol according to Example 1. 14.7 parts of 2-isopropylamino-4-ethylamino-6-trichloromethyl-s-triazine of a melting point of 107–109° C. were obtained.

In an analogous manner the following were produced:
2 - methylamino - 4 - ethylamino - 6 - trichloromethyl-s-triazine.
2 - methylamino - 4 - isopropylamino - 6 - trichloromethyl-s-triazine.
2 - methylamino - 4 - dimethylamino - 6 - trichloromethyl-s-triazine.
2 - ethylamino - 4 - dimethylamino - 6-trichloromethyl-s-triazine.

I claim:
1. In a process for the production of a compound of the formula

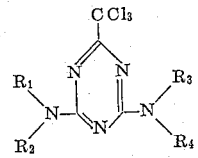

wherein each of $R_1$, $R_2$, $R_3$ and $R_4$ are selected from the group consisting of hydrogen and lower alkyl comprising reacting a compound of a formula selected from the group consisting of and with a compound selected from the group consisting of ammonia, monoloweralkyl amines and diloweralkyl amines in the presence of a lower monohydric aliphatic alcohol, the step of carrying out such reaction in the presence of 0.1 to 10% of an alkali metal alcoholate of a lower monohydric aliphatic alcohol as a catalyst for such reaction.

2. The process of claim 1 in which such reaction is carried out at atmospheric pressure and room temperature.

3. The process of claim 1 in which said alkali metal alcoholate is sodium lower alkanolate.

References Cited in the file of this patent

Weddige: "Journal für praktische Chemie," volume 141 NF33, page 76–90 (1886).